May 28, 1957 G. O. HAGLUND 2,793,602
AUTOMATIC HEADING ADJUSTER SIGNAL CONTROL
Filed June 23, 1952
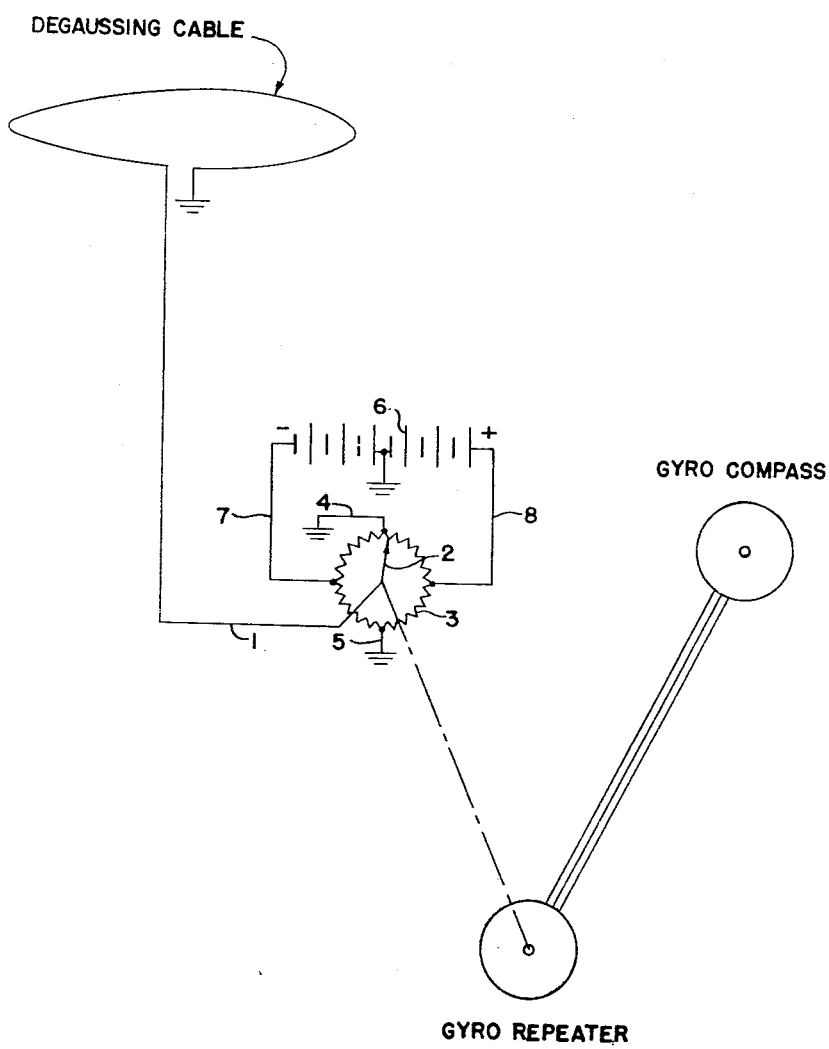
INVENTOR
GERHARD O. HAGLUND
BY
ATTORNEYS

2,793,602

AUTOMATIC HEADING ADJUSTER SIGNAL CONTROL

Gerhard O. Haglund, Minneapolis, Minn.

Application June 23, 1952, Serial No. 295,137

2 Claims. (Cl. 114—240)

(Granted under Title 35, U. S. Code (1952), sec. 266)

The invention described herein may be manufactured and used by or for the Government of the United States of America for governmental purposes without the payment of any royalties thereon or therefor.

This invention relates to an automatic degaussing control for a vessel and more particularly to a means for varying the current within degaussing cables in accordance with a change in the heading of the vessel.

It is well known that degaussing belts are provided on vessels to neutralize the magnetic field thereof so that magnetic mines will be ineffective against such vessels. However, it is apparent that the magnetic field of the ship will vary in accordance with the heading thereof so that heretofore it has been necessary to manually adjust the current flow within the degaussing cable whenever the ship's heading was changed. This invention provides a means for automatically controlling the current flow in the degaussing cable in accordance with the ship's heading.

An object of this invention is to provide a means for neutralizing the magnetic field of a ship regardless of the heading thereof.

Another object of this invention is to provide a means for controlling the current flow in a degaussing cable in accordance with the ship's heading.

A further object of this invention is to control the current flow in a degaussing cable by means of a gyro repeater and potentiometer.

Other objects and many of the attendant advantages of this invention will be readily appreciated as the same becomes better understood by reference to the following detailed descriptions when considered in connection with the accompanying drawing wherein:

The figure represents a schematic view of the invention herein disclosed.

Referring now to the drawing there is shown a degaussing cable which is suitably disposed around the periphery of a vessel and which has one end thereof suitably grounded. The degaussing cable is connected by means of conductor 1 with potentiometer arm 2. Arm 2 is rotatably mounted to follow potentiometer winding 3 which is grounded at 4 and 5 and connected with battery 6 by means of conductors 7 and 8. A gyro repeater controlled by a gyro compass, is provided and is mechanically connected with the potentiometer arm 2 so that a change in the heading of the ship will cause a simultaneous movement of the potentiometer arm.

The winding 3 is designed to produce a sine wave output in the degaussing cable when the potentiometer arm is rotated through 360°. Positions on the potentiometer winding 180° apart produce the same current in opposite directions and 90° rotation of the arm from the position shown in the figure produces a maximum current flow. It is apparent that the potentiometer disclosed herein is represented schematically and that any suitable means may be employed for producing a sine wave current output.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. In a device of the class disclosed, a degaussing coil, a compass controlled gyro repeater, a potentiometer having a rotatable contact element connected to said gyro repeater and settable to different settings selectively in accordance with the settings of the gyro repeater and corresponding respectively to different headings of a vessel, a constant potential battery having the output terminals thereof electrically connected to said potentiometer at a pair of diametrically opposite points thereon, a mid tap on said battery connected to a second pair of points diametrically disposed on said potentiometer mid way between said first named points, and a pair of electrical conductors connecting the terminals of the degaussing coil to said contact element and to said mid tap respectively whereby all the degaussing current in said coil is obtained from said battery and flows through said contact element.

2. A degaussing system for a vessel comprising a degaussing cable, a rotatable potentiometer having the movable element thereof electrically connected to one terminal of said cable, a pair of diametrically arranged points on the resistance element of said potentiometer, electrical conducting means connecting the other end of the cable to said pair of points, a second pair of points on said resistance element disposed diametrically and mid way between said first named pair of points, a constant potential battery connected to said second pair of points, said battery having a mid tap thereon, means for electrically connecting said mid tap to said first named pair of points, a compass controlled gyro repeater, and means connecting the gyro repeater to said movable element whereby all the degaussing current in said cable flows through said contact element and corresponds in strength to the heading of the vessel.

References Cited in the file of this patent

UNITED STATES PATENTS 2,519,395   Perlow et al. _____ Aug. 22, 1950